Aug. 3, 1937.    G. W. WALTON    2,088,626
SCANNING DEVICE
Original Filed Feb. 6, 1930
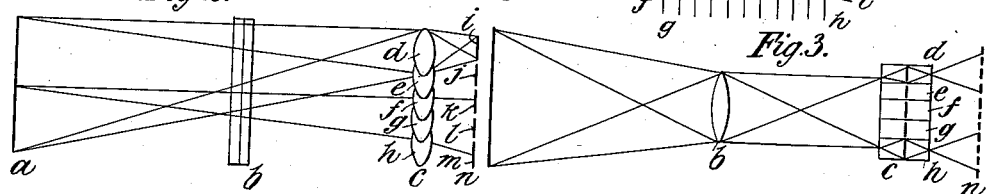
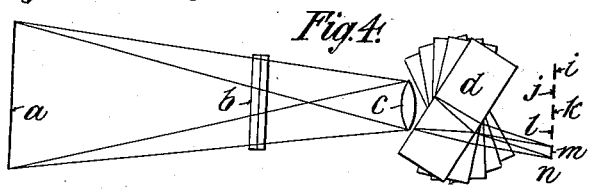
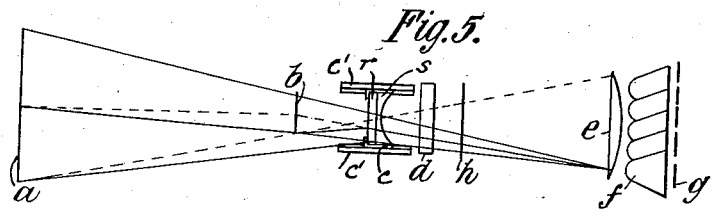
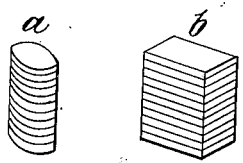
INVENTOR.
G.W.Walton.

Patented Aug. 3, 1937

2,088,626

UNITED STATES PATENT OFFICE 2,088,626

SCANNING DEVICE

George William Walton, London, England

Application February 6, 1930, Serial No. 426,344.
Renewed October 27, 1936. In Great Britain
February 4, 1929

11 Claims. (Cl. 178—6)

This invention relates to optical apparatus, more particularly for the purposes of television, picture recording and reproducing and the like, and is concerned with optical devices capable of simultaneously forming from ordinary scenes, pictures or images, a line or one dimensional picture or image, such as is described in pending U. S. patent specification Serial No. 400,883, filed the 19th October 1929, or forming two dimensional pictures or images from the one dimensional type. The aforesaid patent specification describes the salient types of an echelon or stepped device, and its functions in the conversion of two to one dimension pictures, or vice versa, whilst the present invention is concerned with improved apparatus for the interconversion of one and two dimensional images.

The echelon device is an essential part of any device which affords simultaneous conversion between the two types of picture, and may be any of a large number of possible types, the characteristics of all being that they are stepped optical devices, and are reflecting, refracting, or both combined, having linear, angular or combined displacement of steps, and the steps may be lenticularly formed individually or collectively in groups or all together. It is preferred, for reasons hereinafter explained, that the echelon device be laminated, and methods of manufacture of laminated echelon devices are also described herein.

In optical arrangements, the echelon device is used in combination with a peculiar system of lenses, which may be one of a number of possible systems, and the echelon if lenticularly formed may be part of the system, but in all systems described there is one common feature, namely, that imperfect images of a scene are focussed in two separate and distinct planes, one at or about the entrant surfaces of the echelon device and the other at some plane after the echelon.

In order that the line or one dimensional picture or image shall be of convenient length, it is preferred to, in effect, reduce the length of the image in the direction of deployment relatively to the dimension at right angles to this and methods of accomplishing this are described.

The invention will now be described making reference to the accompanying drawing, which shows in a simple diagrammatic manner representative systems, and their common features, but the invention is by no means limited to the types shown, as only a few of a very large number of possible types are shown, though all may be readily designed from the information given and known optical practice.

Fig. 1 shows diagrammatically the appearance of a line or one dimensional picture as obtained in practice.

Fig. 2 is a diagrammatic plan view of one simple system.

Fig. 3 is a diagrammatic view in side elevation of Fig. 2.

Fig. 4 is a diagrammatic plan view of another simple system.

Fig. 5 is a diagrammatic plan view of another system embodying a focusing adjustment.

Fig. 6 shows some laminated echelon devices arranged for manufacture.

In Fig. 1 is shown the usual appearance of a line picture as obtained in practice, $a$, $b$, $c$, $d$, $e$, $f$, and $g$, $h$ being horizontal strips of an ordinary two dimensional picture which have been laterally displaced or deployed until they no longer overlap each other. As more fully explained in patent application Ser. No. 400,883, when so deployed, there is no need for definition along the line $x$—$x$, but only at right angles thereto, consequently $x$—$x$ may be of any length.

If the original two dimensional picture of which Fig. 1 is a line image is regarded as divided into four rows of elemental areas each row containing ten elemental areas, then each line in Fig. 1, such as $x$—$x$, has a density and colour which is representative of the density and colour of the elemental area which it represents. If the density of the line $x$—$x$ is uniform it clearly is immaterial (excepting from the point of view of practical convenience) whether the line $x$—$x$ is long or short. Each of the portions $a$—$b$, $c$—$d$, $e$—$f$ and $g$—$h$ in Fig. 1 is representative of one line or horizontal strip of the original two-dimensional picture. A portion of Fig. 1 of any convenient width, such as that between the parallels $i$—$j$ and $k$—$l$ may therefore be taken as the one-dimensional representation of the original picture.

Only four sections or strips are shown in Fig. 1, though in practice a large number would be used dependent on the definition required.

Figs. 2 and 3 show a simple optical system applicable to apparatus using a one dimensional picture having a small number of sections.

An object, scene, image or picture $a$ is viewed by a cylindrical lens $b$ which has its axis horizontal, forming an imperfect real image in a plane approximately at the entrance surfaces of the echelon device $c$ which consists of staggered cylindrical lenses. Each step of the echelon being lenticular, views its corresponding part of the object and forms independently a real image of a horizontal strip of the object $a$. The steps of the echelon are cylindrical lenses, arranged with their axes at right angles to the axis of the cylindrical lens $b$ so that the axis of the lens $b$ is substantially parallel to the planes of the lenticular laminae composing the echelon device $c$. The directions of stagger of the lenticular laminae relatively to one another lie in a plane parallel to the axis of the lens $b$. The vertical light cones diverge on leaving the echelon device, but this is of no consequence as lateral displacement has then been effected and a sharp one dimensional image, as shown in Fig. 1, as formed in the focal plane $a$ of $c$, Figs. 2 and 3, the sections being $i$ to $m$, Fig. 2.

In most arrangements, particularly where the echelon has a large number of steps, it is preferable to form the steps lenticularly, but Fig. 4 shows an arrangement not so formed, in plan view only.

In this arrangement, which is similar to Fig. 2, $a$ is the object, $b$ a cylindrical lens forming a horizontal focal plane about the entrance surfaces of the echelon device $d$. A cylindrical lens $c$ is arranged with its axis at right angles to that of the first lens $b$ and forms a vertical focal plane at $n$ but the interposition of the echelon $d$ displaces sections horizontally forming images $i$ to $m$ which constitute a one dimensional representation of the two dimensional picture $a$. The lens $c$ may in some cases be placed after the device $d$, or another similar lens working with the lens $c$ may be placed after the echelon device $d$.

Simple focusing adjustments are desirable, preferably a single one only and Fig. 5 shows such an arrangement which also gives higher definition than the arrangements previously described. In describing this figure the plane of the paper will be regarded as the horizontal plane.

Referring to Fig. 5, an object $a$ is viewed by a compound lens system $c$ comprising a convex cylindrical portion $r$ having its axis horizontal and a concave cylindrical portion $s$ having its axis vertical. This lens system $c$ thus forms a real horizontal focal plane at $h$ and a virtual vertical focal plane at $b$. The focal planes $b$ and $h$ are at a constant distance apart and focusing may therefore be effected simultaneously in both planes $b$ and $h$ by adjusting the lens system $c$ along the optical axis in a slideway $c'$. A horizontal cylindrical lens $d$ of negative power, that is concave which increases the horizontal focal length of the lens system $c$, is provided thereby forming a horizontal focal plane at the entrance surfaces of the echelon device $f$. Each step of the echelon device examines the virtual imperfect image at $b$ forming a reduced real image of a section of $a$ at $g$, the whole giving a one dimensional image at $g$. A field lens $e$ is placed before the echelon device, its focus being about $b$ so that centre rays from $a$ enter all steps of the echelon approximately parallel. The echelon device is of the type shown in Figs. 2 and 3 but is plano-convex and internal reflections within the laminae thereof prevent vertical divergence of the rays up to a point close to $g$.

The optical parts shown in Figs. 2 to 5 are shown in the most simple form, but in actual practice they would be more complex to obtain optical correction. Echelon devices when lenticular may be corrected by the use of a cylindrical or toroidal lens with the axis approximately parallel to the general inclination of the lenticular parts, or more than one may be used inclined at suitable angles. Echelon devices, both for ease of manufacture and simplicity in use, are preferably laminated.

In Fig. 6 there is shown at $(a)$ a stack of laminae for use in constructing the echelon device of Figs. 2 and 3 and at $(b)$ a stack of laminae suitable for use in making the echelon device shown in Fig. 4. Practically all types of the echelon devices may be made of plates reasonably even in thickness and flat with smooth surfaces, for instance, plate glass. The requisite number of plates are cemented or clamped together, and the edges of the plates worked to the desired flat or curved shape together thus ensuring uniformity in the device. After working the cement or clamp is removed and the plates are given the required stagger relatively to one another and are then held at this stagger in any suitable mount.

In order to form the echelon device of Figs. 2 and 3 from the stack of laminae shown in Fig. 6 $(a)$, after the curved surfaces have been worked to the required shape, the cement between the laminae is removed and the laminae are staggered in directions which lie in a plane. In the case of the echelon device of Fig. 4, the laminae in Fig. 6 $(b)$ are staggered rotationally about an axis perpendicular to the planes of the laminae. Usually the lenticular formations are cylindrical and the axis preferably normal to the laminations. In use, provided opaque cement is used or none at all, internal reflection within the laminations is satisfactory without silvering.

The invention is of very great utility in television picture recording transmission and reproduction and in facsimile telegraphy. In television using scanning devices, very simple apparatus is used as there is only one dimension to be scanned at a rate of about 15 per second and any such means as apertured discs or drums, revolving mirrors, oscillating mirrors or parts of the optical system forming a one dimensional picture may be oscillated, and no matter what degrees of definition are being used the scanning device may be the same. Furthermore, the whole television instrument may be small and compact, huge discs or drums not being required even for the highest definition.

In the arrangements of Figs. 4 and 5 the focusing in a vertical plane, that is in the side elevations of those figures, is in effect similar to that shown in Fig. 3.

The echelon devices used in Figs. 2 to 5 need not necessarily be the types shown, for those in Figs. 2, 3 and 5 may be of suitable type which is lenticularly formed, and that shown in Fig. 4 may be any plane refracting or reflecting type.

The complete optical systems may be centred as those shown in Figs. 4 and 5, or uncentred as in Figs. 2, 3 and 5, which in most cases is decided by the type of echelon used.

Very many different optical systems are possible, but all possess the common features fully shown in Figs. 2 to 5, namely, in one axial plane an imperfect real image of the scene, consisting of parallel lines each of those lines being an integration of a line of points of the original scene, is focused at or about the entrant surfaces of the echelon device, with the lines of the image parallel to the steps or laminations of the echelon, and at the same time in an axial plane at an angle to the above, preferably a right angle, a similar imperfect real image is focused in some plane, separate and distinct from the first focal plane either within or after the echelon device, but the lines of this second imperfect image are at an angle, preferably a right angle, to the steps or laminations of the echelon. This is in all cases the final effect, though similar intermediate imperfect images, real or virtual, may be formed as shown in Fig. 4.

There are three main functions performed by systems according to the invention, the focusing of an image representative of the scene on the echelon device in such a manner that the latter divides the scene, picture or image in strips, the lateral displacement of those strips by the echelon device, and the focusing of elements or details along the length of each strip, thereby forming a true one dimensional or line picture or image. These functions may be performed in stages, or simultaneously as shown in Figs. 2 to 5. In those figures the only true image of the original scene, either of the one or two dimensional type, is the final one dimensional image. The size of the image formed in the plane of Fig. 3 is greater than that formed in the plane of Fig. 2, and similarly in the other systems shown, with the result that the one dimensional image is of convenient length. That is to say, for example, assuming that the height of the image in Fig. 3 is the same as the vertical height of the object $a$, the lengths of the images of the horizontal strips are made much less than the lengths of the horizontal strips of the object so that when these strips are arranged end to end the space occupied is not inconveniently great.

In Figs. 2 and 3 light rays from an element or point situated in the top strip of the scene $a$ can only enter the one lamination $h$ of the echelon and no other, and can only be focused in one position in $m$ Fig. 2, and similarly with all other points or elements of $a$ each can have only one position in the line image $i, j, k, l, m$, in Fig. 2. The above also applies to all systems according to the invention.

It will also be obvious that an illuminated line picture or image placed in the plane $n$ Figs. 2 and 3, $i$ to $m$ Fig. 4, and $g$ in Fig. 5, will form in a plane such as $a$ an ordinary two dimensional reconstruction, picture or image, of the original scene represented by the line picture or image, provided that the length of one section of the latter is equal to the length of one section as formed by the system used, that is the length of one section of the picture or image must be equal to that of $m$ in Fig. 2. From this it is seen that the invention offers a ready means of conversion from two to one dimensional pictures or images, and vice versa.

I declare that what I claim and desire to secure by Letters Patent is:—

1. Apparatus for television, picture recording and reproducing and like purposes comprising optical means adapted to form simultaneously from an object an image in which representations of all the elemental areas of said object are deployed so that they do not overlap one another viewed at least in a direction normal to the direction of said deployment, said optical means including two optical systems one of which comprises a spherical lens and the other of which comprises a cylindrical lens and an echelon device composed of a plurality of optically active laminae each having two parallel major surfaces of relatively large area and an edge surface of relatively small area, each of said laminae being arranged with one of said major surfaces contiguous with a major surface of another of said laminae and said laminae being staggered relatively to one another, the axis of curvature of said cylindrical lens being disposed parallel to some of said major surfaces.

2. Apparatus for television, picture recording and reproducing and like purposes comprising optical means adapted to form simultaneously from an object an image in which representations of all the elemental areas of said object are deployed so that they do not overlap one another viewed at least in a direction normal to the direction of said deployment, said optical means including two optical systems one of which comprises a cylindrical lens and the other of which comprises a second cylindrical lens and an echelon device composed of a plurality of optically active laminae each having two parallel major surfaces of relatively large area and an edge surface of relatively small area, each of said laminae being arranged with one of said major surfaces contiguous with a major surface of another of said laminae and said laminae being staggered relatively to one another, the axes of curvature of said cylindrical lenses being inclined relatively to one another and the axis of said second cylindrical lens being disposed parallel to the major surfaces of some of said laminae.

3. Apparatus for television, picture recording and reproducing and like purposes comprising optical means adapted to form simultaneously from an object an image in which representations of all the elemental areas of said object are deployed so that they do not overlap one another viewed at least in a direction normal to the direction of said deployment, said optical means including two cooperating optical systems one of which comprises a spherical lens and the other of which comprises a cylindrical lens and an echelon device composed of a plurality of refractively acting laminae each having two parallel major surfaces of relatively large area and an edge surface of relatively small area, each of said laminae being arranged with one of said major surfaces contiguous with a major surface of another of said laminae and said major surfaces being staggered relatively to one another, the axis of curvature of said cylindrical lens being disposed parallel to some of said major surfaces.

4. Apparatus for television, picture recording and reproducing and like purposes comprising optical means adapted to form simultaneously from an object an image in which representations of all the elemental areas of said object are deployed so that they do not overlap one another viewed at least in a direction normal to the direction of said deployment, said optical means including two optical systems one of which comprises a cylindrical lens and the other of which comprises a second cylindrical lens and an echelon device composed of a plurality of refractively acting laminae, the axes of curvature of said cylindrical lenses being inclined relatively to one another and the axis of curvature of said second cylindrical lens being disposed parallel to the planes of said laminae, said laminae being arranged contiguously and staggered along a line joining the centers of curvature of the laminae.

5. Apparatus for television, picture recording and reproducing and the like purposes having two optical systems one of which comprises an echelon device composed of a plurality of like cylindrical lenses arranged contiguously and staggered in a direction transverse of their axes of curvature and transverse of their optic axes, corresponding points in said lenses lying in a plane and a cylindrical lens disposed with its axis of curvature substantially parallel to the axes of curvature of the cylindrical lenses of said echelon device and the second of said systems comprising two cylindrical lenses the axes of curvature of which are substantially parallel to one another and substantially perpendicular to the axes of curvature of the lenses of the first-named system.

6. Apparatus according to claim 5, wherein said cylindrical lens of said first-named system and one of said two lenses of said second system are fixed to a common support, said support being movable for focusing purposes.

7. Apparatus according to claim 5, wherein said cylindrical lens of said first-named system and one of said two lenses of said second system are formed integrally.

8. Apparatus according to claim 5, wherein said cylindrical lens of said first-named system and one of said two lenses of said second system are formed integrally and are mounted so as to be movable for focusing purposes.

9. An optical system for television, picture recording and reproducing and the like purposes comprising a cylindrical lens, an echelon device composed of a plurality of laminae each having two parallel major surfaces of relatively large area and an edge surface of relatively small area, each of said laminae being in the form of a cylindrical lens and being arranged with one of said major surfaces contiguous with a major surface of another of said laminae, and said laminae being staggered in a direction transverse of their axes of curvature and transverse of their optic axes with some of the major surfaces parallel to a plane containing the main optical axis of said system and the axis of curvature of said cylindrical lens.

10. An optical system for television, picture recording and reproducing and the like purposes comprising a cylindrical lens, an echelon device composed of a plurality of laminae each having two parallel major surfaces of relatively large area and an edge surface of relatively small area, each of said laminae being in the form of a cylindrical lens and being arranged with one of said major surfaces contiguous with a major surface of another of said laminae, and said laminae being disposed in staggered formation with their axes of curvature parallel and offset with respect to one another, said axes being disposed in a plane substantially perpendicular to the optical axis of said system and the first-named cylindrical lens being disposed with its axis of curvature in a plane containing the said optical axis and substantially parallel to some of said major surfaces.

11. An optical system for television, picture recording and reproducing and the like purposes comprising a cylindrical lens, an echelon device composed of a plurality of laminae each having two parallel major surfaces of relatively large area and an edge surface of relatively small area, each of said laminae being arranged with one of said major surfaces contiguous with a major surface of another of said laminae, and said laminae being staggered in a direction transverse of their axes of curvature and transverse of their optic axes, with their major surfaces parallel to a plane containing the main optical axis of said system and the axis of curvature of said cylindrical lens.

GEORGE WILLIAM WALTON.